(No Model.) 2 Sheets—Sheet 1.

A. BURDICK & H. T. WETZEL.
SPRING MOTOR FOR VEHICLES.

No. 544,955. Patented Aug. 20, 1895.

Witnesses:
Geo. E. Fuchs.
James C. Bevan

Inventors:
Alfred Burdick
Henry T. Wetzel
per Pattison & Nesbit
Attorneys.

(No Model.) 2 Sheets—Sheet 2.

A. BURDICK & H. T. WETZEL.
SPRING MOTOR FOR VEHICLES.

No. 544,955. Patented Aug. 20, 1895.

Witnesses:
Geo. E. Fuch.
James O. Berant.

Inventors.
Alfred Burdick
Henry T. Wetzel
per Pattison & Nesbit
Attorneys.

UNITED STATES PATENT OFFICE.

ALFRED BURDICK AND HENRY T. WETZEL, OF HUBBELL, NEBRASKA.

SPRING-MOTOR FOR VEHICLES.

SPECIFICATION forming part of Letters Patent No. 544,955, dated August 20, 1895.

Application filed March 8, 1895. Serial No. 541,002. (No model.)

*To all whom it may concern:*

Be it known that we, ALFRED BURDICK and HENRY T. WETZEL, of Hubbell, in the county of Thayer and State of Nebraska, have invented certain new and useful Improvements in Spring-Motors for Vehicles; and we do hereby declare the following to be a full, clear, and exact description of the invention, such as will enable others skilled in the art to which it pertains to make and use the same, reference being had to the accompanying drawings, which form part of this specification.

Our invention relates to improvements in spring-motors for vehicles, and pertains to that class which are adapted to be wound either by hand, by the momentum of the vehicle in going down hills, or by any other suitable means.

The object of our invention is to provide a spring-motor for use upon vehicles of any description, the motor consisting of a series of springs adapted to operate a mechanism either separately or jointly, and said mechanism to in turn impart a movement to the driving-wheels of the vehicle.

Figure 1:
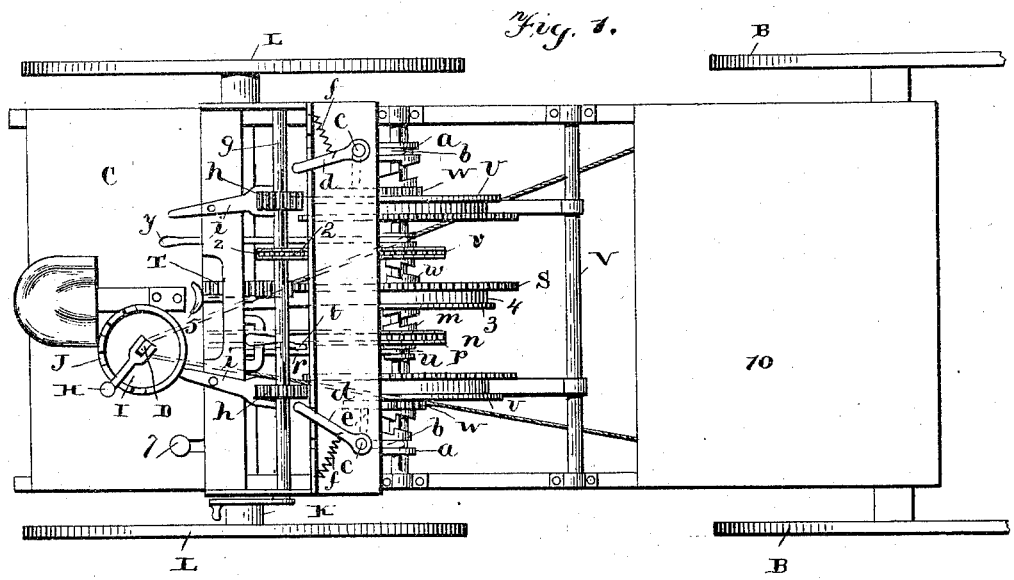
Figure 2:
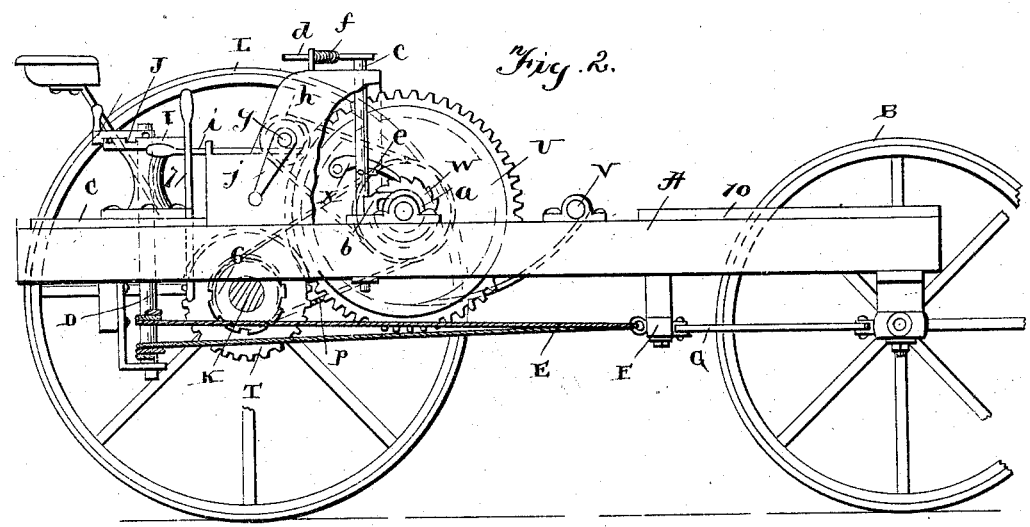
Figure 3:
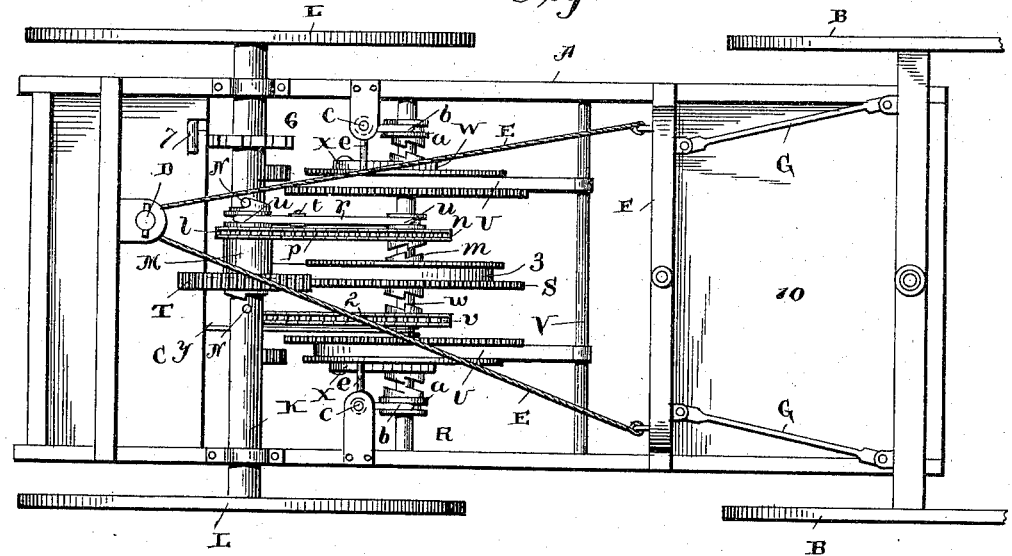
Figure 4:
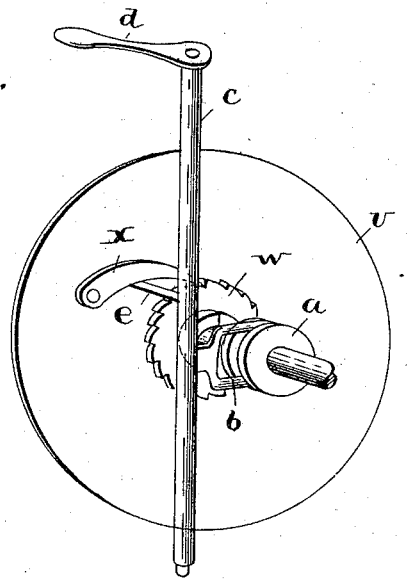

Figure 1 is a top plan view of a vehicle embodying our invention. Fig. 2 is a side elevation, the driving-wheels being broken away to show the mechanism. Fig. 3 is an inverted view. Fig. 4 is a detached view of the lever for releasing either spring and at the same time locking it to the driving-shaft.

A indicates the body or frame of the vehicle, and B the front wheels. The front wheels are placed upon an axle which is pivoted at its center, and at the rear of the vehicle is a platform C, upon which the seat of the engineer or driver will be placed. Passing through this platform C is the vertical shaft D, having attached to its lower end the ropes, chains, or cords E, the opposite ends of these cords being attached to opposite ends of an intermediately-pivoted lever F, and this lever F is in turn connected by means of links G to opposite sides of the center of the front axle. From this description it will be seen that a rotary movement in either direction of the vertical shaft will turn the front wheel for the purpose of guiding. Attached to the upper end of the vertical shaft is an operating-handle H, pivotally connected at its inner end to adapt it to be lifted, and surrounding the vertical shaft is a standard or boxing I, having its upper flange provided with notches J. By means of this construction the vertical shaft can be turned through the medium of the handle attached thereto, and then locked in any desired position by dropping the handle into the notches upon the boxing or standard.

The rear axle K, carrying at its opposite ends the driving-wheels L, is provided with a collar M, adapted to be thrown in and out of engagement with said shaft. This is accomplished by means of transverse pins N, between which the collar is placed, and at one side of the collar is a shoulder and inclined flange, and at the opposite side of the collar an incline and shoulder Q, extending in the opposite direction, whereby the endwise movement of the collar will lock the same to the shaft when the said collar is revolving in opposite directions—that is to say, when revolving in one direction, one end of the collar will lock it to the shaft, and when revolving in the opposite direction the other end of the collar will likewise lock it to the shaft by bringing it in engagement with the said transverse pin by the endwise movement of the collar.

Journaled upon the frame in front of the driving-shaft is a motor-shaft R, carrying preferably at its center a cog-wheel S, which is rigidly connected therewith. This cog-wheel S is adapted to engage a cog-wheel T upon the collars before referred to, so that when the motor-shaft is revolved it will impart a revolution to the driving-shaft. Placed upon this motor-shaft are two, three, four, or more spring-drums U, as occasion may dictate, each drum carrying a spring which has one end attached thereto and its opposite end connected to a cross-rod V. Each spring-drum also has at its outer side a ratchet-wheel W, adapted to be engaged by spring or gravity dogs X. Each of these spring-drums is free to revolve upon the motor-shaft and is locked thereto, when desired, by means of a clutch or collar $a$, provided for each spring-drum. The gravity dog or latch is operated by means of an arm $b$, placed upon vertical shaft $c$, having at its upper end a handle $d$, and this shaft also caries an arm $e$, extending at right angles to the other arm, and this arm $e$ is adapted to engage the groove in the locking-collars for the spring-drum. There is a vertical shaft for each spring-drum, and the vertical shafts are normally held in a position to permit the spring or gravity dog to engage the ratchets of the spring-drums by means of a spring $f$. From this description it will be understood that when the handle of the vertical shaft is moved in one direction the gravity or spring dog is lifted from the spring-drum ratchet, thus releasing it and permitting the spring-drum to be turned by the power of its spring, and simultaneously moves the locking-collar to lock the spring-drum to the motor-shaft. The power of this spring is then transmitted from the motor-shaft to the central cog-wheel, and from that to the cog-wheel of the collar upon the driving-shaft of the vehicle. From this description it will be seen that each spring-drum can be independently released, and either the power of one or of several be transmitted to the motor-shaft at the same time, and from thence to the driving-shaft of the vehicle.

Above and just in rear of the motor-shaft is a winding-shaft $g$, carrying a pinion $h$ for each of the cog-wheels of the spring-drums. These pinions $h$ are adapted to be moved upon this winding-shaft independently of each other by means of the levers $i$ having their inner ends bifurcated to extend at each side of the pinions. The movement of either of these levers will throw the pinions either in or out of engagement with the cog-wheel of its adjacent spring-drum. At one end of this winding-shaft is a handle $j$, by means of which it may be operated, and the spring-drums be wound up, as will be readily understood.

The collar upon the driving-shaft of the vehicle has at the opposite end from the cog-wheel a sprocket-wheel $l$, and a collar $m$ is placed upon the motor-shaft at one side of the rigid central cog-wheel. This collar is adapted to engage a sprocket-wheel $n$, around which, and also around the sprocket-wheel $l$, the sprocket-chain $p$ passes, thus connecting the two sprocket-wheels operatively together. The collar upon the motor-shaft rotates freely thereon and is adapted to be locked to the rigid cog-wheel by means of suitable projections, or the said collar may be locked to the motor-shaft, as convenience may dictate. An arm or plate $r$ has at each end a yoke $u$, which engage grooves in the two collars, and this plate or arm is moved by means of a lever $t$. In this way the two collars are simultaneously moved in the same direction. The object of this construction is that by the movement of these collars in one direction the cog-wheel of the driving-shaft is brought into engagement with the rigid cog-wheel of the motor-shaft, and drives the vehicle forward. When, however, the collars are moved in the opposite direction, motion and power are transmitted to the driving-shaft through the medium of the sprocket-chain just described, and this reverses the revolution of the driving-shaft and thus drives the vehicle backward through the power from the spring-motor.

The spring-drums may be wound by the momentum of the vehicle downhill through the medium of a sprocket-wheel $v$, attached to a collar $w$ upon the motor-shaft. This collar $w$ is provided with shoulders adapted to engage with similar shoulders upon the rigid cog-wheel of the motor-shaft, and thus to lock it thereto when moved in engagement therewith by means of a lever $y$. Placed upon the winding-shaft is a sprocket-wheel $z$, and around this sprocket-wheel and the sprocket-wheel of the collar a chain 2 passes, as shown in the drawings. It will thus be seen that when the vehicle is going downhill the motor-shaft is driven through the medium of the rigid cog-wheel, and then by locking this sprocket-wheel to the rigid cog-wheel the winding-shaft is revolved, and by throwing the pinions of the winding-shaft into either one or more of the spring-drums they are likewise wound, as will be readily understood. The rigid cog-wheel of the motor-shaft is provided with a brake 3, which is a band 4, having attached to one end a foot-lever 5. By this construction the driver operates this band-brake by means of his foot for the purpose of regulating the speed of the machine.

For the purpose of making a quick and almost instantaneous stop, to prevent accidents, we have provided upon the driving-shaft a wheel 6 and have pivoted upon the frame-lever 7, adapted to engage the teeth of this wheel. It will thus be seen that by engaging this lever with the teeth of the wheel a stoppage of the driving-shaft is effected, and therefore a very quick stop of the machine. From this description it will be seen that we have provided a spring-motor adapted to drive a vehicle either forward or backward, and adapted to be wound by hand, the momentum, or by any suitable power.

At the front of the vehicle is a platform 10, adapted to receive a number of seats or a box, as the purpose of the vehicle may demand.

Having thus fully described our invention, what we claim, and desire to secure by Letters Patent, is—

A spring motor comprising a motor shaft, a driving shaft, the motor shaft having a rigid cog-wheel, the driving shaft having a collar carrying a cog wheel and a sprocket wheel, and adapted to move the cog-wheel out of engagement with the motor rigid wheel, a collar upon the motor shaft and adapted to rotate free thereof a sprocket wheel, a sprocket chain passed around the said sprocket wheels, and a means for throwing the sprocket collar of the motor shaft in and out of locking engagement therewith, for the purpose of driving the drive shaft of the vehicle in either direction, for the purpose described.

In testimony whereof we affix our signatures in presence of two witnesses.

ALFRED BURDICK.
HENRY T. WETZEL.

Witnesses:
WILLIAM H. MALONE.
EDWARD RENDER.